United States Patent [19]
Monroe

[11] Patent Number: 5,257,130
[45] Date of Patent: Oct. 26, 1993

[54] APPARATUS AND METHOD FOR CREATING A REAL IMAGE ILLUSION

[75] Inventor: Marshall M. Monroe, Glendale, Calif.

[73] Assignee: The Walt Disney Company, Burbank, Calif.

[21] Appl. No.: 829,698

[22] Filed: Jan. 30, 1992

[51] Int. Cl.$^5$ .............................................. G02B 27/22
[52] U.S. Cl. ...................................................... 359/478
[58] Field of Search ........................................... 359/478

[56] References Cited

U.S. PATENT DOCUMENTS

| | | |
|---|---|---|
| 995,607 | 6/1911 | Kempinski . |
| 2,210,806 | 8/1940 | Etbauer ................... 359/478 |
| 2,576,147 | 11/1951 | Sauvagé ................... 359/478 |
| 2,679,188 | 5/1954 | Gould ...................... 359/478 |
| 3,293,983 | 12/1966 | Gaudyn . |
| 3,317,206 | 5/1967 | Holt ........................ 359/478 |
| 3,647,284 | 3/1972 | Elings et al. . |
| 4,509,837 | 4/1985 | Kassies . |
| 4,671,625 | 6/1987 | Noble . |
| 4,802,750 | 2/1989 | Welck . |
| 4,927,238 | 5/1990 | Green et al. ............ 359/478 |
| 5,065,116 | 11/1991 | Ueda et al. . |
| 5,144,482 | 9/1992 | Gould ..................... 359/478 |
| 5,172,266 | 12/1992 | Garcia et al. ............ 359/478 |

OTHER PUBLICATIONS

Theory and Problems of Optics by Eugene Hecht, Ph.D., Chapter 4, cover page, (pp. 55, 82 and 86) total 5 pages. (1975).

Calculus and Analytic Geometry, by George B. Thomas, Jr. and Ross L. Finney, published by Addison-Wesley Publishing Co., Fifth Edition, exerpts, p. 406, cover and title pages, total 4 pages. Mar. 1980.

Some Parameters and Characteristics Of An Off-axis paraboloid, Paper 2791, Society of Photo-Optical Instrumentation Engineers, Sep., 1991, vol. 30, No. 9, pp. 1277-1280, total 4 pages.

*Primary Examiner*—Rodney B. Bovernick
*Assistant Examiner*—Evelyn A. Lester
*Attorney, Agent, or Firm*—Pretty, Schroeder, Brueggemann & Clark

[57] ABSTRACT

An apparatus and method for creating real image illusions utilizes a partially transparent scrim positioned between the real image and an optical system which produces the real image from a corresponding real object. When the scrim is illuminated by a light source or projector in front of and at an oblique angle to the scrim, the scrim forms a seemingly solid and non-transparent surface that conceals the optical system from view by an observer. The scrim also protects the optical system from damage and other vandalism, yet it does not distort or interfere with the light rays passing through the scrim to form the real image. The scrim also avoids distracting surface reflections, ghosting and other highlights.

53 Claims, 5 Drawing Sheets

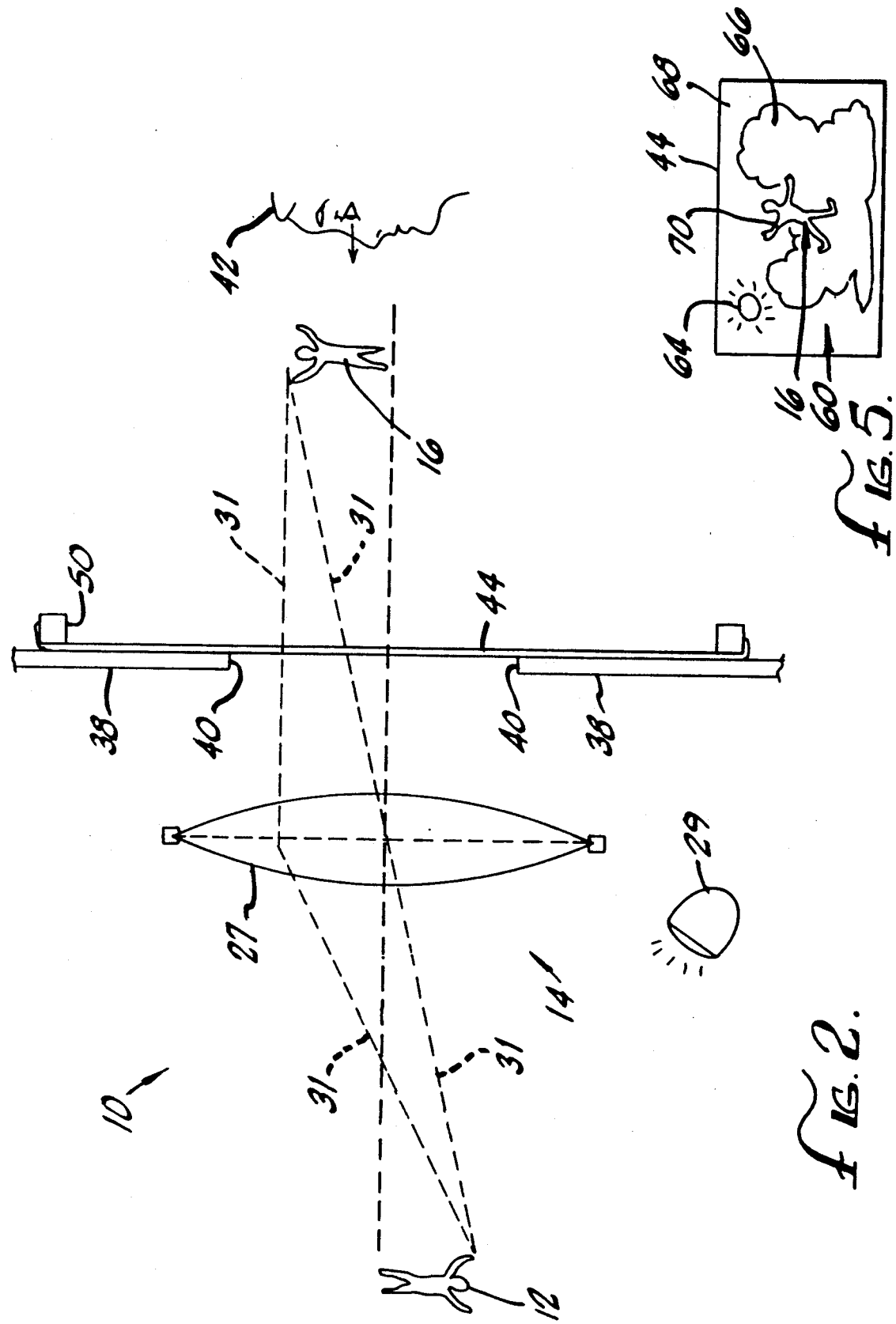

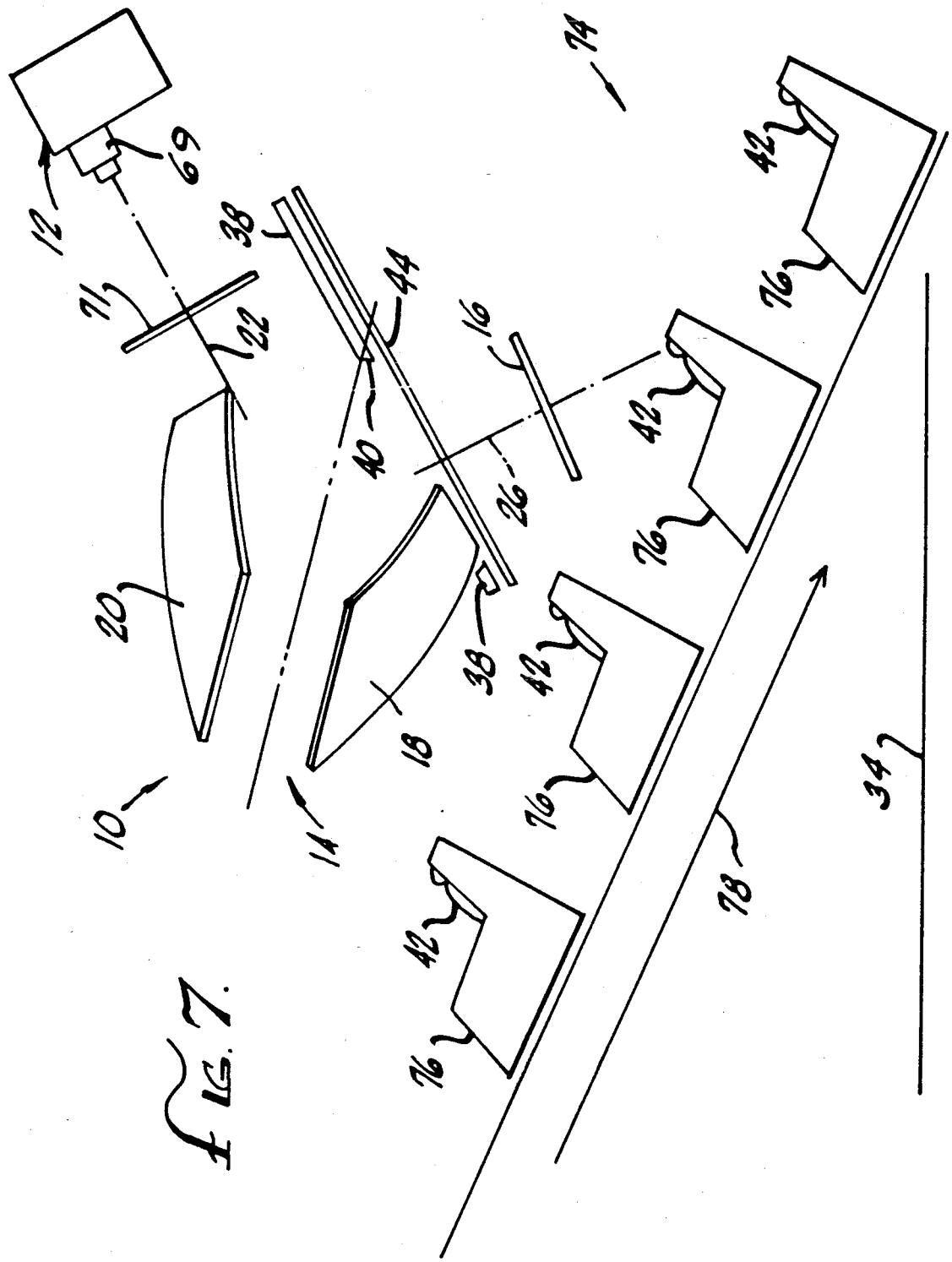

APPARATUS AND METHOD FOR CREATING A REAL IMAGE ILLUSION

BACKGROUND OF THE INVENTION

The present invention relates to devices and methods for creating real images and, more particularly, to an apparatus and method for creating a real image illusion having enhanced visual and other special effects.

Real images have been used for many years to create optical illusions and other special effects which amuse and entertain the public. Real images are created when light is reflected from a real object and focused toward a region corresponding to the real image. Various optical systems have been used in the past to generate real images. The most common optical systems use either transmissive optics or reflective optics, such as spherical or parabolic mirrors, in combination with a real object. Other common means for creating real images, in addition to transmissive and reflective optics, include holographic optical elements and the like.

One common reflective optical system for creating real images is described in U.S. Pat. No. 4,802,750. It comprises two paraboloids of revolution in the form of parabolic reflectors which face each other at an offset angle. A real object placed in the focus region of the first or primary reflector produces parallel light rays. The other, secondary reflector receives these parallel light rays and refocuses them to create a real image in the focus region of the secondary reflector. Parabolic reflective optical systems such as these are generally regarded as producing the clearest and sharpest real image available, since spherical reflectors only approximate the desired visual effect and produce a relatively blurred image that distorts heavily when viewed from an off-axis location.

While real images have the potential to be a very powerful technique for creating optical illusions and other special effects, the present systems for creating real images have several limitations which inhibit more versatile and effective use of the technique. For example, observers who are viewing the real image are able to see the source optics that create the image. The ability of observers to see the source optics eliminates the element of magic and intrigue associated with the image. Furthermore, the unsightly source optics detract from the special visual effect of the optical illusion. At present, there is no known solution for solving these problems.

The ability of observers to view the source optics also adversely affects the performance and maintenance of the optics. For instance, some observers who see the source optics are prone to interfere with and vandalize them by throwing food, liquids or other objects at the source optics. Interference and vandalism of this nature can occlude the reflective surfaces of the source optics and thus severely inhibit generation of the real image. If the interference and vandalism are severe enough, the real image may be totally destroyed.

A further drawback associated with the visibility of the source optics is that it detracts from the observer's perception of depth and overlap of the real image, since the existing background behind the image invariably includes the source optics. This circumstance presents further significant limitations on the versatility and effective use of the real image.

At present, about the only practical solution to prevent interference by observers has been to place a glass shield between the source optics and the real image. These glass shields, which do not conceal the source optics, typically have an anti-reflective coating to help reduce the reflective properties of the glass. However, the anti-reflective coating undesirably decreases the transmissiveness of the glass shield such that the light level at the region of the real image is generally too low. As a result, the real image appears unrealistic and hard to see. Moreover, these glass shields, despite their anti-reflective coatings, still produce first-surface reflections and highlights which are distracting to the observers and which erode the intended effect of the real image.

The inability to conceal the source optics also places significant limitations on the visual effects that can be used in combination with the real image. If an anti-reflective glass shield is used, it still does not conceal the source optics, and the first-surface reflections and highlights certainly do not enhance the visual effects for the reasons discussed above. However, as also stated above, if the glass shield is not used, the source optics will be clearly unprotected. Hence, the quality and versatility of the present devices and methods for creating real image illusions is severely restricted.

Another drawback of current devices and methods for creating real image illusions resides in the limitations associated with the real object. The most common type of real object is a three-dimensional physical object. However, three-dimensional physical objects tend to be motionless and therefore produce very unimaginative real images. To the extent motion can be imparted to three-dimensional physical objects, it is very limited.

Accordingly, there has existed a definite need for an apparatus and method for creating a real image illusion in which the source optics are concealed from view by observers and which can be protected from damage or other observer-related interference. There further has existed a definite need for a real image illusion which enhances the observer's perception of depth and overlap of the real image with its background and which is free of restrictions when used in combination with other visual effects. The present invention satisfies these and other needs, and provides further related advantages.

SUMMARY OF THE INVENTION

The present invention provides an apparatus and method for creating a real image illusion in which the source optics are protected and concealed from view by an observer. This is accomplished simply and effectively by placing a selectively transparent scrim between the real image and the source optics, which produce the real image from a corresponding real object. When the scrim is illuminated by a light source positioned at an oblique angle to the scrim, the scrim forms a seemingly solid and non-transparent surface that advantageously conceals the source optics, yet allows the converging light rays forming the real image to pass through the scrim without distortion or interference, and without producing distracting surface reflections or highlights on the scrim.

In one embodiment of the invention, the scrim is constructed from a woven material comprising a loose weave of fine threads connected together in a criss-cross pattern at a plurality of points. The scrim has a density of approximately five to fifteen points per inch and, preferably, a medium density in the range of ten points per inch. With this construction, the scrim forms a plurality of regularly and closely spaced apertures that make the scrim transparent. These apertures, in turn, are bounded by the substantially non-transparent threads forming the scrim. This scrim configuration allows the real object light rays, which converge to form the real image, to pass at almost a normal angle through the apertures in the scrim to produce the real image in front of the scrim. It also allows the light rays from the light source, projected onto the scrim from an oblique angle, to illuminate the non-transparent scrim material and form a seemingly solid surface that conceals the source optics from view.

The scrim advantageously does not interfere with the converging light rays forming the real image. Although these light rays are converging to a predetermined focus region corresponding to the real image in front of the scrim, these light rays are nevertheless still substantially normal to the scrim at the point where they pass through the apertures in the scrim. Thus, interference with the light rays converging to form the real image is relatively insignificant. Since the light rays from the light source impinge upon the scrim at an oblique angle, preferably at about 45 degrees, these light rays generally do not pass through the apertures to illuminate the source optics. Instead, the light rays only illuminate the non-transparent scrim material. This illumination may be caused by placing the light source either in front of or behind the scrim.

In one aspect of the invention, the light source comprises a projector in front of the scrim for projecting a visual image onto the scrim. The visual image on the scrim may be static, as in the case of an overhead projector, or it may be dynamic, as in the case of a motion picture projector. The motion picture projector may comprise any suitable motion picture medium, such as a film or video projector.

In another aspect of the invention, the real object preferably comprises a high-resolution CRT. When the real object is a CRT, the real object can be made to appear movable and scalable and, thus, the corresponding real image can be made movable and scalable. Scaling of the real image also can be accomplished by moving the scrim along an axis normal to the scrim. Other possibilities for producing a movable or dynamic real image include the use of a motion picture medium as the real object, such as a video or film projector focused on a rear projection screen. In yet another embodiment, the real object may comprise either a hologram or a laser scan that focuses on a material having a substantially black background. Of course, the real object may also comprise a traditional three-dimensional physical object.

When the real image formed in front of the scrim and the visual image projected on the scrim are both dynamic images, these images may be synchronized and coordinated such that they appear to interact with each other. For example, the visual image on the scrim may comprise a background setting including the sun, clouds and a blue sky, and the real image may comprise an individual moving about as though he or she is flying. Although it obviously is impossible for individuals to fly through the air, the apparatus and method of this invention enable the creation of the impossible effect of an individual who appears to be flying. By using a dynamic visual image on the scrim, the speed, altitude and angle at which the individual is flying may be altered as desired. These and other fantastic visual effects and illusions within the observer's viewing region are thus made possible. The background visual image on the scrim also offers a frame of reference and significant motion parallax when the observer moves from side to side, thus enhancing the depth, overlap and overall dimensionality of the real image illusion.

The source optics may comprise a conventional optical system, including transmissive or reflective optics. In the preferred embodiment, two parabolic reflectors are configured and arranged to face each other in such a way that the real object behind the scrim and the real image in front of the scrim lie substantially along a common optical axis.

In another aspect of the invention, the visual image projected onto the scrim can be made to appear substantially non-distorted, even though the image is projected onto the screen at an oblique angle. By programming software in an appropriate manner, the actual visual image projected at an angle by the projector can be distorted appropriately so that the resulting visual image projected by the projector onto the scrim appears substantially non-distorted.

In still another aspect of the invention, the scrim is also acoustically transparent and a sound source may be placed in the region of the real object behind the scrim such that the optical system produces a corresponding real image sound in the region of the real image in front of the scrim. In one preferred embodiment, the sound source is a loudspeaker. When the sounds from this loudspeaker are appropriately coordinated and synchronized with the motion of one or both of the real image formed in front of the scrim or the visual image projected onto the scrim, an enhanced visual and audio effect can be achieved. Moreover, the real image sound can be placed in front of the scrim in very close proximity to the observers to produce a very dramatic effect.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 2 is an elevational view of another embodiment of the apparatus, using transmissive optics;

FIG. 5 is a front elevational view of the screen, taken substantially along the line 5—5 of FIG. 4;

FIG. 7 is an elevational view showing still another embodiment of the apparatus, using a rear projection technique in an amusement ride.

DETAILED DESCRIPTION OF THE PREFERRED EMBODIMENTS

Figure 1:
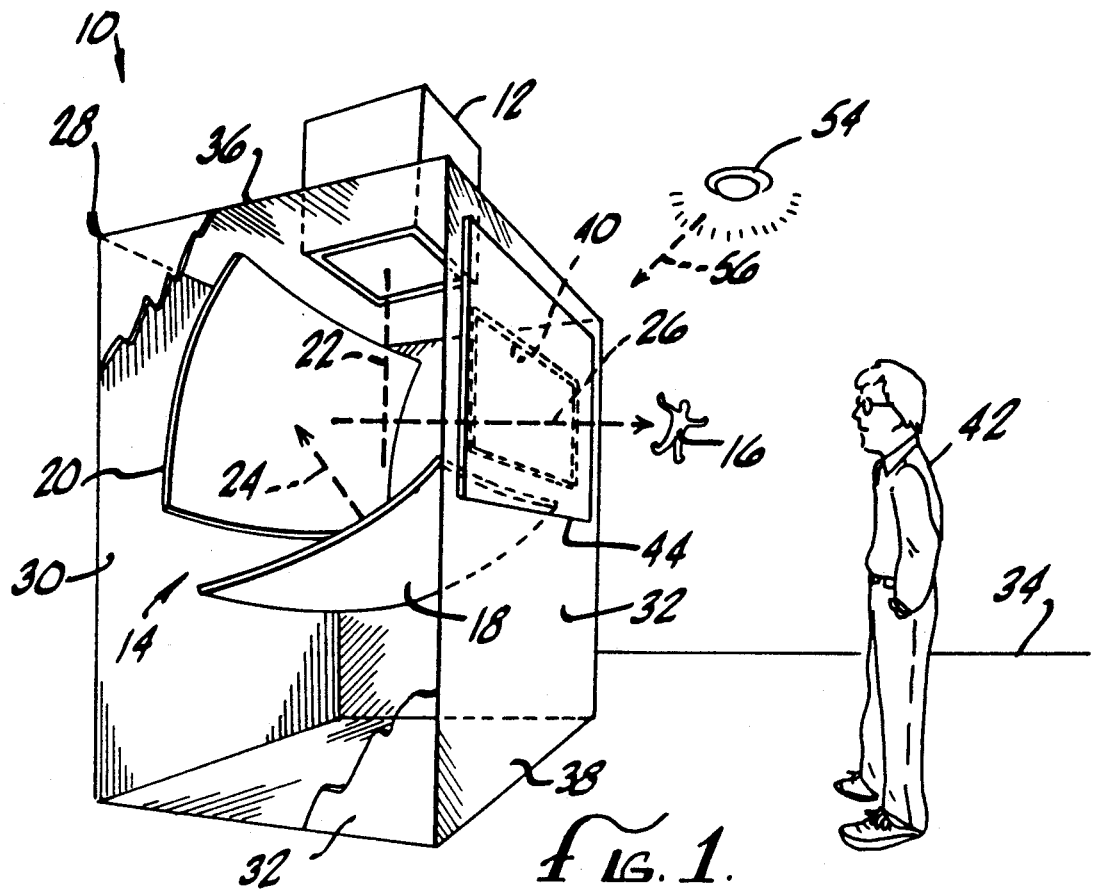
FIG. 1 is a perspective view showing an apparatus for creating a real image illusion embodying the novel features of the present invention, showing a real image in front of an observer.

As shown in the exemplary drawings, the present invention is embodied in an apparatus, generally referred to by the reference numeral 10, for creating a real image illusion. The apparatus 10 advantageously includes means for protecting and concealing the source optics so that they cannot be seen or damaged by an observer. Real image illusions produced in accordance with the present invention also have an enhanced perception of depth, overlap and overall dimensionality. The apparatus 10 of the present invention furthermore is intended to be relatively simple in construction, reliable in operation and relatively inexpensive to maintain.

FIG. 1 shows one embodiment of the apparatus 10 for creating the real image illusion. The apparatus comprises a real object source 12 and an optical system 14 for producing a real image 16. Although many different types of optical systems 14 may be used to produce the real image 16, the apparatus 10 in the preferred embodiment uses a reflective optical system comprising two parabolic mirrors or reflectors 18 and 20. These reflectors 18 and 20 face each other at an offset angle, with the real object source 12 placed in the focus region of the first or primary reflector 18. This reflector 18 receives light rays 22 from the real object source 12 and converts them to parallel light rays 24 which are received by the other, secondary reflector 20. The secondary reflector 20 then refocuses these parallel light rays 24, reflected by the primary reflector 18, to form converging light rays 26 which form the real image 16 in the focus region of the secondary reflector 20.

Reflective optical systems for creating the real image 16 in the preferred embodiment of the invention are described in U.S. Pat. No. 4,802,750 and are available from Grand Mirage Corporation of Campbell, California. A parabolic reflective optical system is preferred, since it presently is the best available system for producing the clearest and sharpest real image 16.

Although an optical system using parabolic reflectors 18 and 20 is used in the preferred embodiment of the invention, various other optical systems, or any other device or method, may be used to generate the real image 16. For example, reflective optics in the form of spherical mirrors may be used in combination with the real object source 12. Other means for creating the real image 16 include transmissive optics and holographic optical elements. Therefore, it should be understood that any device for generating the real image 16 may be used.

Figure 4:
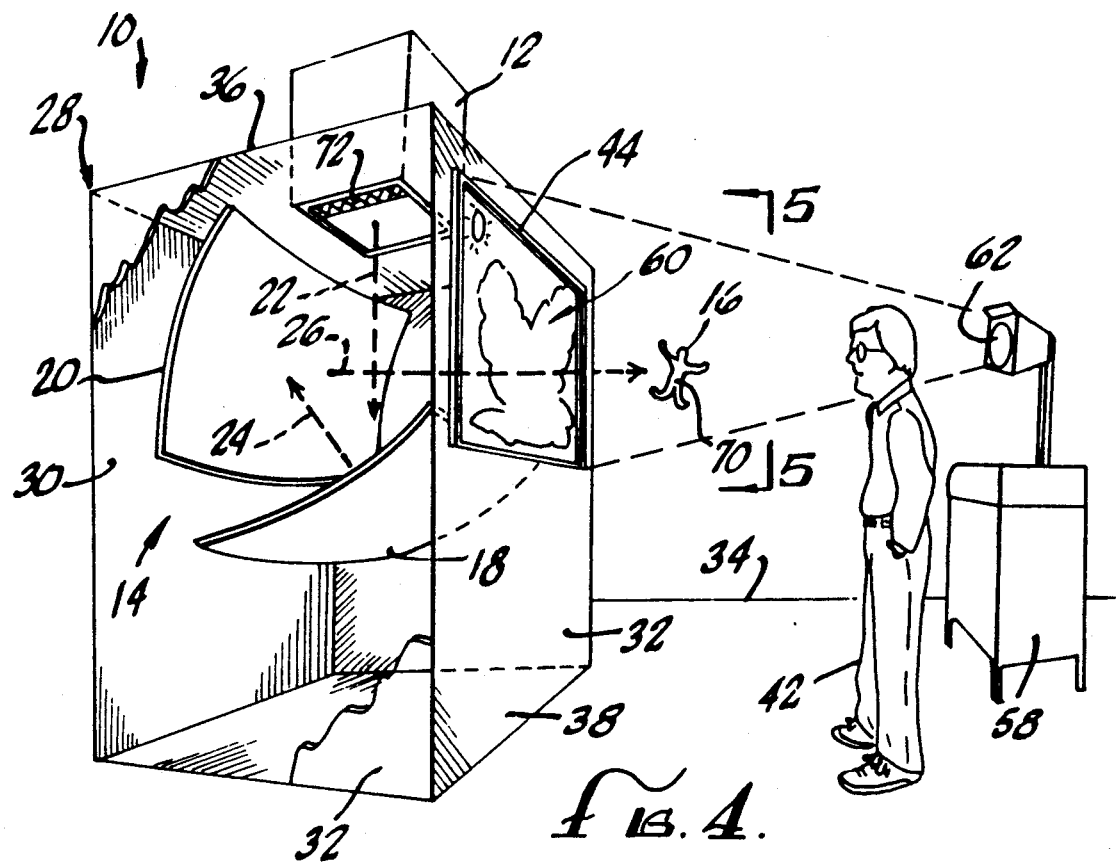
FIG. 4 is another perspective view of the apparatus of FIG. 1, showing a visual image on the screen behind the real image.

FIG. 2 shows one embodiment of a suitable transmissive optical system having a transmissive optical element 27. A light 29 is used to illuminate the real object source 12, which is inverted. The light rays 31 reflected from the real object source 12 pass through the optical element 27 and converge to form the real image 16. The optical element 27 could also be, for example, a holographic optical element which emulates the desired optical characteristics of an actual lens, such as the lens transfer function The clarity and sharpness of the real image 16 can be improved by shielding the real object source 12 and optical system 14 from unwanted ambient light. In the preferred embodiment, the unwanted ambient light is excluded by an enclosure 28 which houses the optical system 14. As shown in FIGS. 1 and 4, the enclosure 28 comprises a solid back wall 30 and two solid side walls 32 extending vertically from the floor or other horizontal support 34. The top wall 36 is horizontal and supports the real object source 12 in the focus region of the primary reflector 18. The enclosure 28 further includes a vertical front wall 38 having an opening 40 through which the converging light rays 26 may pass from the secondary reflector 20 to form the real image 16 at a location outside the enclosure 28. The size of the enclosure 28 and its opening 40 may be appropriately designed in relation to the relative size of the real object source 12 and optical system 14 for producing the real image 16.

Ordinarily, an observer 42 viewing the real image 16 is able to see through the opening 40 in the enclosure 28 and, thus, can see the optical system 14 for producing the real image 16. As described previously, this is highly undesirable for several reasons and poses significant problems in the performance and maintenance of the optical system 14 and the quality of the resulting real image 16.

In accordance with the invention, the optical system 14 is protected and concealed from view by the observer 42, without distorting or interfering with the quality of the real image 16, and without producing any distracting surface reflections or highlights, as in the prior art anti-reflective glass shields. In the preferred embodiment, the optical system 14 is protected and concealed by a screen 44 positioned in front of the opening 40 in the enclosure 28. The screen 44 completely covers the opening 40, but it may be larger if desired.

Figure 3B:
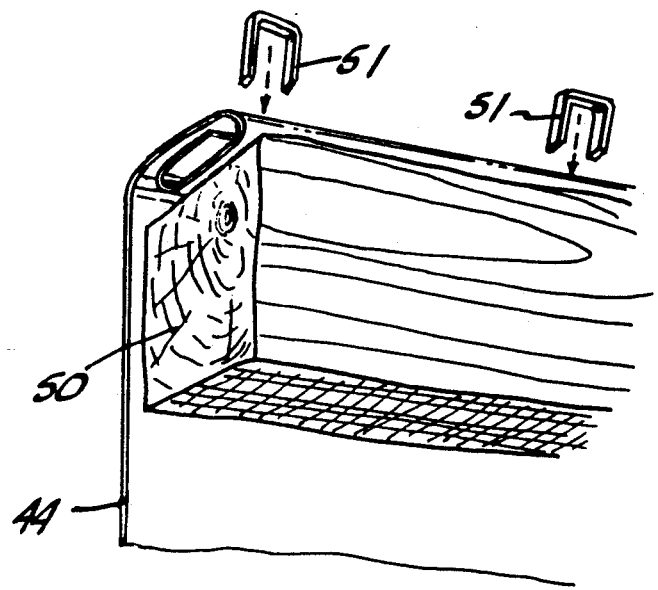
FIG. 3B is a perspective view of the screen showing a method of attaching it to a frame.
Figure 3C:
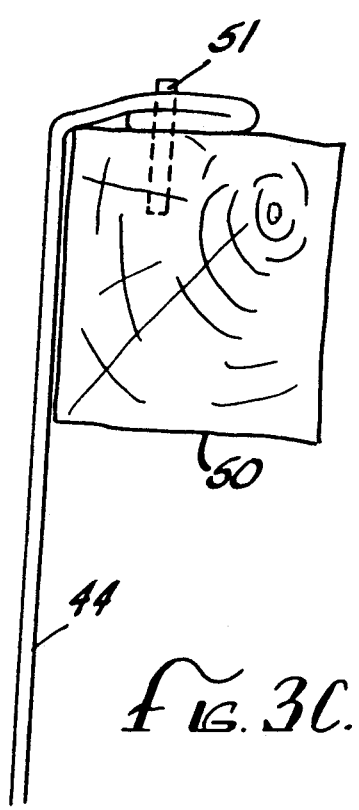
FIG. 3C is a cross-sectional elevational view of the screen and frame.
Figure 3A:
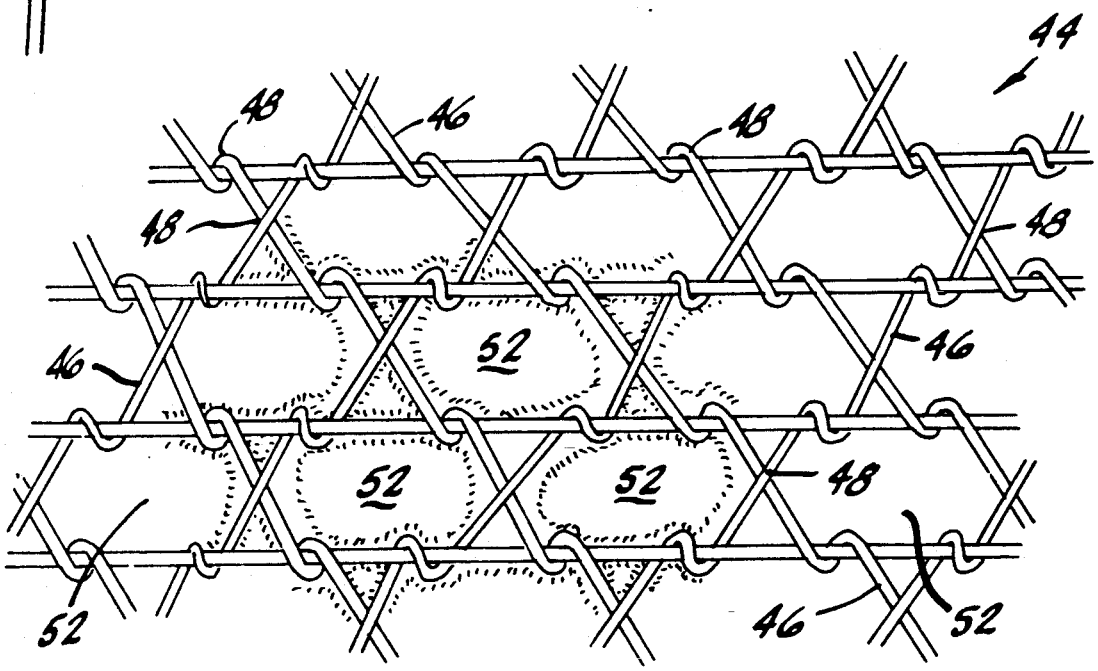
FIG. 3A is an enlarged elevational view of a portion of a screen for use in creating and enhancing the real image illusion

In one embodiment of the screen 44, shown in FIGS. 3A-3B, the screen comprises a scrim 44, such as a theatrical scrim, constructed from a woven material comprised of relatively fine intersecting threads 46 bound together at a plurality of points 48. The scrim 44 may be attached to and supported by an appropriate frame 50 or the like using suitable fasteners 51. The scrim 44 is then placed in front of the opening 40 by any appropriate means. The density of the scrim 44 may be varied between approximately five to fifteen points 48 per inch, and a preferred scrim has a medium density in the range of ten points 48 per inch. This construction of the scrim 44 forms a plurality of regularly and closely spaced apertures 52, defined by the intersecting threads 46, that makes the scrim 44 selectively transparent and allows the real object light rays 26 to pass through the apertures 52 to produce the real image 16 in front of the scrim.

While the preferred embodiment of the scrim 44 has regularly and closely spaced apertures 52, these apertures may be irregularly or randomly spaced, so long as they still provide sufficient transparency to the scrim 44 or other screen material. Otherwise, interference with the converging light rays 26 and corresponding interference with the real image 16 will occur.

Suitable scrims 44 have substantially rectangular apertures 52 with dimensions of about 0.045 inch by 0.060 inch. These apertures are spaced apart from each other by about 0.010 inch, corresponding to about two thicknesses of the threads 46 where they intersect at the points 48. Scrims 44 having this construction are available from Dazian's Fabrics in Beverly Hills, Calif. and elsewhere under the names Isolda Black and Isolda Grey. Of course, scrims 44 having other suitable aperture configurations, such as round apertures, may be used.

The scrim 44 advantageously does not interfere with or distort the converging light rays 26 forming the real image 16. Although these light rays 26 from the secondary reflector 20 are not exactly normal to the scrim 44, since they are converging to a predetermined focus region corresponding to the real image 16 in front of the scrim 44, the regular and close spacing of the apertures 52, and the fact that the scrim 44 is extremely thin, make the scrim substantially transparent to the rays 26. Moreover, at the point where the light rays 26 pass through the scrim 44, these light rays 26 can still be said to be substantially normal to the scrim for all intents and purposes. Thus, any interference by the scrim threads 46 with the light rays 26 converging to form the real image 16 is relatively insignificant and does not cause distortion or diminish the light level of the real image 16 in a noticeable amount.

When the scrim 44 is illuminated by a light source 54 positioned in front of the scrim, as shown in FIG. 1, the light rays 56 projected onto the scrim create the appearance of a solid and non-transparent surface or wall. Alternatively, the light source 54 may be placed behind the scrim 44. In the preferred embodiment, the light source 54 is positioned in front of and at an oblique angle to the scrim 44. Since the light rays 56 from the light source 54 impinge upon the screen 44 at an oblique angle, these light rays generally do not pass through the apertures 52 in the scrim 44 and, therefore, do not illuminate the optical system 14. Instead, the light rays 56 only illuminate the non-transparent scrim material 46, thereby concealing the optical system 14 from view. In addition, of course, the scrim 44 protects the optical system 14 and prevents access by an observer 42 who ordinarily might be tempted to throw food, liquid or other objects through the opening 40 that could damage the reflectors 18 and 20 and compromise or destroy the real image 16.

By projecting light rays 56 onto the scrim 44 from an oblique angle, the scrim is made to appear to the observer as a solid wall. Nevertheless, the scrim 44 still remains transparent to the light rays 56 from the real object source 12, allowing them to pass through from behind the scrim and converge to form the real image 16 in front of the scrim 44. When the ambient light and angle of incidence of the projected light rays 56 is balanced correctly, it has been determined that the observer 42 will have no visual cues that there is any optical system 14 or opening 40 behind the scrim 44. In addition, the scrim 44 provides a background image for the observer 42 which offers a frame of reference and significant motion parallax when the observer moves from side to side. This significantly enhances the depth, overlap and overall dimensionality of the real image illusion Presently, a fine gray bobbinette scrim has exhibited optimum characteristics for serving as an off-axis front projection scrim, while simultaneously allowing transmission of the converging real image light rays 26 from behind the scrim 44. This scrim also is available from Dazian's Fabrics in Beverly Hills, Calif.

In one aspect of the invention, shown in FIG. 4, the light source 54 comprises a projector 58 in front of the scrim 44 for projecting a visual image 60 onto the scrim. The projector 58 may be designed to produce either a static visual image or a dynamic visual image. In the case of a static visual image, an overhead projector comprises one preferred form of projector 58. In the case of a dynamic image, a motion picture projector may be used. Any suitable motion picture medium may be used as the motion picture projector, such as a film or video projector. The projector also can be positioned behind the scrim, if desired.

Like the conventional light source 54, the projector 58 also is positioned in front of and at an oblique angle to the scrim 44. When front projection occurs at an oblique angle, as noted above, a minimum amount of light passes through the apertures 52 in the scrim 44. Also, the observer 42 will not see a "hot-spot" corresponding to the projector light 62 which would be reflected back to the observer 42 by the secondary reflector 20 if the projector 58 was substantially aligned with the observer or otherwise normal to the scrim 44. In the preferred embodiment, an oblique angle of approximately 45 degrees is sufficient to avoid hot-spots and prevent illumination of the optical system 14.

Since the visual image 60 from the projector 58 is being projected at an oblique angle to the scrim 44, some distortion of the visual image on the scrim will occur. At oblique angles of approximately 45 degrees, the amount of distortion is relatively unnoticeable to the untrained eye. However, the visual image 60 projected onto the scrim 44 can be made to appear substantially nondistorted by appropriately distorting the actual image that is being projected from the projector 58. For example, in the case of computer graphics, the actual image being projected can be distorted by programming software in an appropriate manner corresponding to the angle of projection. With the actual visual image distorted in this manner prior to projection, the resulting visual image 60 projected by the projector 58 onto the scrim 44 appears substantially non-distorted.

Instead of using a projector 58 to project the visual image onto the scrim 44, the scrim can be painted or otherwise provided with a visual image or design on its front surface. When this visual image is illuminated by the light source 54, it will appear substantially the same as a static visual image projected by the projector 58. If desired, an ultra-violet paint can be used in combination with a black light as the light source 54 to create the visual image. Of course, conventional paint and white light can be used as well.

Figure 6:
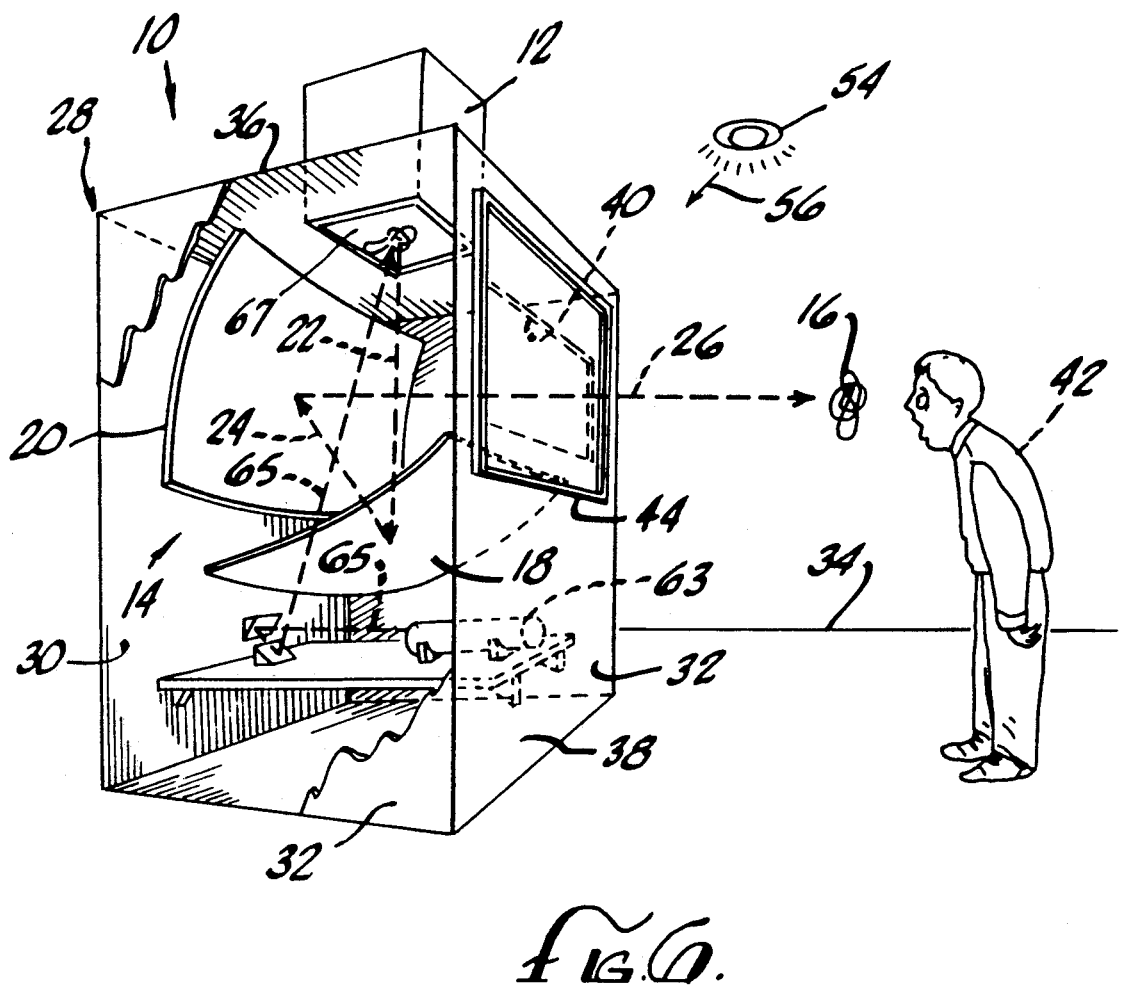
FIG. 6 is a perspective view showing yet another embodiment of the apparatus, using a laser scan device.

The real object source 12 also can be selected to produce either a static real image or a dynamic real image 16. In the case of static real images, a conventional three dimensional physical object may be used. In the case of a dynamic real image, it has been found that a high resolution CRT functions as an excellent real object source 12 to produce an extremely clear and sharp real image 16 that appears to have three dimensions. By making all of the inner surfaces of the enclosure 28 black in color, and by using a black background on the CRT, a two dimensional visual image on the CRT may be made to appear as a realistic three dimensional real image 16. Other possibilities for producing a movable or dynamic real image include the use of a hologram or a motion picture medium as the real object source 12. For example, in one embodiment, shown in FIG. 6, the real object source 12 may be created by a laser scan device 63 that focuses laser light rays 65 on a material 67 having a substantially black background. In this embodiment, the laser scan device 63 may project between the parabolic reflectors 18 and 20 like a front projector onto the black background material 67 located in the region of the real object source 12. In another embodiment, shown in FIG. 7 and discussed in more detail below, the real object source 12 may comprise a video or film projector 69 focused on a rear projection screen 71.

When the real image 16 formed in front of the scrim 44 and the visual image 60 projected on the scrim 44 are both dynamic images, these images may be synchronized and coordinated in such a way that they appear to interact with each other. As shown in FIGS. 4–5, the visual image projected by the projector may comprise, for example, a background setting including a sun 64, clouds 66 and a blue sky 68. The real image 16 created by the real object source 12, such as the CRT, may comprise, for example, an individual 70 whose motions make it appear as though he or she is flying. Thus, the composite effect of using a bright two dimensional projected image as the real object from the CRT, in combination with a front projected scrim visual image, can create a startling dimensional and convincing real image 16. In effect, the real image 16 will appear to be in mid-air and, therefore, the individual 70 can be made to appear as though he or she is flying through the air. By calculating the focal lengths of the two parabolic reflectors 18 and 20, and by controlling the viewing sight lines, a real image 16 can be placed in mid-air right in front of the observer 42.

Although it is impossible for a real person to fly through the air, the apparatus and method of the present invention enable the creation of this special effect. The effect can be enhanced by coordinating the motion of the visual image 60 on the scrim 44 and the motion of the real image 16 in front of the scrim 44 such that the apparent speed, altitude and angle at which the individual is flying may be altered as desired. Other fantastic and seemingly impossible visual effects and optical illusions within the observer's viewing region may be created and will be apparent to those skilled in the art. For example, the individual 70 could be made to appear as though walking on a bookshelf or other platform by placing an actual bookshelf or platform under the real image 16. These and other visual cues can be used in an endless variety of ways to support and enhance the illusion.

As noted above, a high resolution CRT display works extremely well as the real object source 12, since it permits display of full-color animated images on a very dark background (which is invisible in the region of the real image). In addition, however, the CRT also enables scaling of the object appearing on the display of the CRT. By changing the scale of visual display within the plane of the CRT monitor, the observer 42 will perceive the illusion of a real image 16 translating on an axis perpendicular to the surface of the scrim 44. This ability to scale the real object source 12 and make the real image 16 appear as though it is moving in a direction perpendicular to the scrim 44, makes the resulting optical illusion appear even more amazing.

Scaling of the real image 16 also can be accomplished by moving the scrim 44 along an axis perpendicular to the scrim. Movement of the scrim 44 toward the real image 16 makes the real image appear smaller, and vice versa. By moving the scrim 44 along this axis, the scrim can be moved in front of the real image 16, such that it is between the real image 16 and the observer 42. When the scrim 44 is moved through the real image 16, the real image will appear to pass through the scrim, creating a very unique and fascinating illusion. In addition, the scrim 44 may be movable with respect to the real image 16 along other axes, if desired, to create other real image illusions.

In still another aspect of the invention, the scrim 44 is acoustically transparent and a real image sound may be created in the region of the real image 16. This may be accomplished by placing a sound source 72 (FIG. 4) in the region of the real object source 12 such that the parabolic reflectors 18 and 20 reflect the sound and focus it in the region of the real image 16. In this way, a real image sound can be placed in front of the scrim 44 in very close proximity to the observer 42. When this sound is coordinated with the visual image 60 on the scrim 44 and the real image 16 in front of the scrim 44, a very dramatic visual and audio effect may be created.

The apparatus 10 of the present invention is expected to have utility in many different fields. For example, as shown in FIG. 7, it is contemplated that the apparatus 10 will be used in an amusement ride 74 of the type found in amusement parks, theme parks and the like. In one embodiment, the amusement ride 74 may comprise a plurality of ride vehicles 76 that move along a path 78. In this embodiment, the real object source 12 is a video or film projector 69 projecting an image onto a rear projection screen 71. The parabolic reflectors 18 and 20 produce a real image 16 corresponding to the image on the rear projection screen 71 at a location along the path 78 that is visible by the observer 42. The scrim 44 may be illuminated by either the light source 54 or the projector 58, as desired. By using one or more of the techniques described above, a very unusual and fascinating real image illusion can be presented to the observer 42.

From the foregoing, it will be apparent that the present invention provides an apparatus and method for creating a real image illusion in which the optical system is concealed from view by observers 42 and, therefore, is protected from damage or other observer-related interference. The scrim 44 which protects and conceals the optical system 14, in combination with visual images projected onto the scrim 44 at an oblique angle, significantly enhance the perception of depth, overlap and overall dimensionality of the real image illusion. Moreover, by synchronizing and coordinating the visual image 60 on the scrim 44 with the real image 16 in front of the scrim 44, an endless variety of real image illusions and other special effects can be created.

While a particular form of the invention has been illustrated and described, it will be apparent that various modifications can be made without departing from the spirit and scope of the invention. Accordingly, it is not intended that the invention be limited, except as by the appended claims.

I claim:

1. An apparatus for creating a real image illusion, comprising:
   (a) a selectively transparent screen having a plurality of apertures;
   (b) a real object source and a device behind the screen for producing light rays, corresponding to the real object source, which pass through the apertures in the screen and converge to form a real image in front of the screen; and
   (c) a light source for projecting light rays onto the screen and creating the appearance of a solid and non-transparent surface which prevents visual access behind the screen.

2. The apparatus of claim 1, wherein the light source is positioned in front of and at an oblique angle to the screen.

3. The apparatus of claim 1, wherein the light source is positioned behind and at an oblique angle to the screen.

4. The apparatus of claim 1, wherein the light source is a projector positioned in front of or behind the screen.

5. The apparatus of claim 4, wherein the projector is positioned in front of and at an oblique angle to the screen.

6. The apparatus of claim 5, wherein the oblique angle is approximately 45 degrees.

7. The apparatus of claim 5, wherein the projector comprises an overhead projector for producing a static image on the screen.

8. The apparatus of claim 5, wherein the projector comprises a motion picture projector for producing dynamic images on the screen.

9. The apparatus of claim 5, wherein the real object source and the projector are configured and synchronized with each other to produce a dynamic real image in front of the screen which interacts with a dynamic visual image on the screen.

10. The apparatus of claim 9, wherein the real image is scalable.

11. The apparatus of claim 1, wherein the real object source comprises a real object produced by a CRT, a laser scan focused on a substantially black background, or a video or film projector focused on a rear projection screen.

12. The apparatus of claim 1, wherein the screen comprises a scrim with a density of between approximately five and fifteen points per inch.

13. The apparatus of claim 1, wherein the screen comprises a medium density scrim having approximately ten points per inch.

14. The apparatus of claim 1, further comprising a sound source placed in the region of the real object source for creating a real image sound in the region of the real image.

15. The apparatus of claim 14, wherein the sound source is a loudspeaker.

16. An apparatus for creating a real image illusion, comprising:
    (a) a selectively transparent scrim;
    (b) a real object source and a device behind the scrim for producing a real image, corresponding to the real object source, in front of the scrim; and
    (c) a projector in front of and at an oblique angle to the scrim for projecting an image onto the scrim and substantially concealing the device for producing the real image from view by an observer.

17. The apparatus of claim 16, wherein the oblique angle is approximately 45 degrees.

18. The apparatus of claim 16, wherein the scrim has a density of between approximately five and fifteen points per inch.

19. The apparatus of claim 16, wherein the scrim has a density of approximately ten points per inch.

20. The apparatus of claim 16, wherein the scrim is constructed from a woven material comprised of fine threads which intersect each other to form a plurality of apertures, wherein each of the apertures has a dimension of approximately 0.045 inch to 0.060 inch, and wherein the apertures are spaced apart from each other by approximately 0.010 inch.

21. The apparatus of claim 16, wherein the scrim has a density that allows light rays, which converge to form the real image, to pass through apertures in the scrim to produce the real image in front of the scrim, and that allows the light rays from the projector in front of the scrim to illuminate the scrim so that the device for producing the real image behind the scrim is substantially concealed from view by the observer.

22. The apparatus of claim 16, wherein the real object source comprises a real three-dimensional physical object.

23. The apparatus of claim 16, wherein the real object source comprises a motion picture medium.

24. The apparatus of claim 23, wherein the motion picture medium comprises a laser scan focused on a substantially black background, or a video or film projector focused on a rear projection screen.

25. The apparatus of claim 16, wherein the real object source is a CRT.

26. The apparatus of claim 16, wherein the real image is scalable.

27. The apparatus of claim 26, wherein a CRT is used to produce a scalable visual image as the real object source to thereby enable corresponding scaling of the real image.

28. The apparatus of claim 26, wherein the scrim is movable with respect to the real image along an axis that is substantially perpendicular to the scrim so as to make the real image scalable.

29. The apparatus of claim 16, wherein the projector in front of the scrim comprises a light source for projecting light rays onto the scrim.

30. The apparatus of claim 16, wherein the projector in front of the scrim comprises an overhead, video or film projector.

31. The apparatus of claim 16, wherein the device for producing the real image is an optical system.

32. The apparatus of claim 31, wherein the optical system is a transmissive optical system.

33. The apparatus of claim 31, wherein the optical system is a reflective optical system.

34. The apparatus of claim 33, wherein the optical system comprises two parabolic reflectors which face each other in such a way that the real object source behind the scrim and the real image in front of the scrim lie substantially along a common optical axis.

35. An apparatus for creating a real image illusion, comprising:
    (a) a real object source and a device for producing a real image corresponding to the real object source;
    (b) a selectively transparent screen that allows light rays corresponding to the real image to pass through the screen to form the real image in front of the screen, wherein the screen is movable with respect to the real image such that the screen may be moved through the real image to a plurality of positions behind or in front of the real image; and
    (c) a light source for projecting light rays onto the screen.

36. The apparatus of claim 35, wherein the screen is movable in a plurality of directions with respect to the real image.

37. A method for creating a real image illusion, comprising:
    (a) erecting a selectively transparent screen having a plurality of apertures;
    (b) producing a real image in front of the screen by utilizing a real object source and a device behind the screen for producing light rays, corresponding to the real object source, which pass through the apertures in the screen and converge to form the real image in front of the screen; and (c) projecting light rays onto the screen such that the screen appears to be a non-transparent surface preventing visual access behind the screen.

38. The method of claim 37, further comprising projecting the light rays onto the screen from an oblique angle to the screen.

39. The method of claim 38, comprising projecting the light rays from a location in front of or behind the screen.

40. The method of claim 37, further comprising projecting a visual image on the front of the screen by a projector located at an oblique angle to the screen.

41. The method of claim 37, further comprising producing a dynamic real image in front of the screen and a dynamic visual image on the screen.

42. The method of claim 41, comprising synchronizing and coordinating the real image and the visual image such that the images appear to interact with each other.

43. The method of claim 42, further comprising scaling the real image with respect to the visual image.

44. The method of claim 37, further comprising moving the screen in a plurality of directions with respect to the real image.

45. The method of claim 44, comprising moving the screen along an axis substantially perpendicular to the screen such that the screen is selectively moved in front of and behind the real image.

46. The method of claim 40, further comprising distorting the image projected by the projector at an oblique angle such that the visual image projected onto the screen is substantially non-distorted.

47. An amusement ride, comprising:

(a) a ride vehicle for moving guests along a path through the amusement ride;
(b) a selectively transparent screen having a plurality of apertures, wherein the screen is positioned along the path and is observable by the guests;
(c) a real object source and a device behind the screen for producing light rays, corresponding to the real object source, which pass through the apertures in the screen to form a real image in front of the screen that is observable by the guests; and
(d) a light source for projecting light rays onto the screen and creating the appearance of a solid surface concealing the real object source and device from view.

48. The amusement ride of claim 47, wherein the light source is a projector positioned at an oblique angle to the screen for projecting static or dynamic visual images on the screen.

49. The amusement ride of claim 48, wherein the light source is positioned in front of or behind the screen.

50. The amusement ride of claim 48, wherein the real image is a dynamic real image that is coordinated and synchronized to interact with the visual image projected on the screen.

51. The amusement ride of claim 50, further comprising a sound source in the region of the real object source for producing a real image sound in the region of the real image.

52. The amusement ride of claim 47, wherein the screen is selectively movable with respect to the real image such that the screen may be moved to a plurality of positions, including positions in front of and behind the real image.

53. The amusement ride of claim 47, wherein the real image is scalable.

* * * * *